United States Patent
DeVries et al.

(10) Patent No.: US 11,326,715 B2
(45) Date of Patent: May 10, 2022

(54) SNAP-ON FAUCET HANDLE

(71) Applicant: Delta Faucet Company, Indianapolis, IN (US)

(72) Inventors: Adam M. DeVries, Anderson, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 16/791,455

(22) Filed: Feb. 14, 2020

(65) Prior Publication Data

US 2021/0254748 A1  Aug. 19, 2021

(51) Int. Cl.
*F16K 31/60* (2006.01)
*E03C 1/04* (2006.01)

(52) U.S. Cl.
CPC .......... *F16K 31/605* (2013.01); *E03C 1/0412* (2013.01)

(58) Field of Classification Search
CPC ............. F16K 31/605; Y10T 137/9464; E03C 1/0412; E03C 2201/50
See application file for complete search history.

(56) References Cited

U.S. PATENT DOCUMENTS

| | | |
|---|---|---|
| 5,025,826 A | 6/1991 | Schoepe et al. |
| 5,257,645 A | 11/1993 | Scully et al. |
| 5,947,149 A * | 9/1999 | Mark ............... F16K 31/602 137/359 |
| 6,438,771 B1 | 8/2002 | Donath, Jr. et al. |
| 8,074,893 B2 | 12/2011 | Mace |
| 8,079,381 B2 | 12/2011 | Fischer et al. |
| 9,062,796 B2 | 6/2015 | Horsman et al. |
| 10,184,571 B2 | 1/2019 | Chen et al. |
| 10,774,946 B2 * | 9/2020 | Mooren ............... B25G 3/18 |
| 11,035,485 B2 | 6/2021 | Lin |
| 2006/0174946 A1 | 8/2006 | Kajuch |
| 2009/0120519 A1 | 5/2009 | Chen |
| 2010/0071778 A1 | 3/2010 | Nelson |
| 2010/0200081 A1 * | 8/2010 | Fischer ............. F16K 31/607 137/359 |
| 2011/0073205 A1 | 3/2011 | Marty |

(Continued)

FOREIGN PATENT DOCUMENTS

| | | |
|---|---|---|
| AU | 2005229735 | 5/2007 |
| CN | 103836253 | 6/2014 |

(Continued)

*Primary Examiner* — Marina A Tietjen
(74) *Attorney, Agent, or Firm* — Bose McKinney & Evans LLP (57) ABSTRACT

A handle assembly for a faucet includes a receiver defined by a handle body and having a vertically tapered side wall defining a receiving chamber, a slot extending through the tapered side wall into the receiving chamber, and a wire form retainer coupled around the receiver and being at least partially disposed within the slot for extending into the receiving chamber. A tapered valve stem includes a retaining recess, and wherein the tapered valve stem is received within the receiving chamber of the receiver so that at least a portion of the wire form retainer extends through the slot of the receiver and is received within the retaining recess of the tapered valve stem.

19 Claims, 6 Drawing Sheets

(56) References Cited

U.S. PATENT DOCUMENTS

| | | | |
|---|---|---|---|
| 2011/0220827 A1* | 9/2011 | Tortorello | F16K 31/602 |
| | | | 251/231 |
| 2012/0273075 A1 | 11/2012 | Pitsch et al. | |
| 2015/0152975 A1 | 6/2015 | Jonte | |
| 2017/0211721 A1 | 7/2017 | Ritter | |
| 2019/0178403 A1 | 6/2019 | Crowe et al. | |
| 2019/0271140 A1* | 9/2019 | Davidson | F16D 1/12 |
| 2020/0063407 A1* | 2/2020 | Zhu | E03C 1/0404 |
| 2020/0088317 A1* | 3/2020 | Bai | E03C 1/0412 |
| 2020/0102724 A1* | 4/2020 | Rosko | E03C 1/0403 |

FOREIGN PATENT DOCUMENTS

| | | |
|---|---|---|
| CN | 209398908 | 9/2019 |
| DE | 102005029050 | 1/2007 |
| DE | 102015219524 A1 | 4/2017 |
| GB | 687692 A | 2/1953 |
| JP | 2889009 | 10/1992 |
| JP | 2004251050 | 9/2004 |

* cited by examiner

SNAP-ON FAUCET HANDLE

BACKGROUND AND SUMMARY OF THE DISCLOSURE

The present disclosure relates generally to a faucet and, more particularly, to a device for coupling a handle to a stem of a faucet valve cartridge.

The present disclosure allows a handle to be coupled to and uncoupled from a faucet valve cartridge by snapping it on and off a valve stem. Typical faucet handles use threaded fasteners (e.g., set screws) to couple to a valve stem. The handle assembly of the present disclosure allows for less assembly time, and a reduction of scrap due to fastener cross-threading often resulting from the use of conventional threaded fasteners. It also allows for a lower profile handle by providing for a potential attachment point below the top of an associated bonnet cap.

According to an illustrative embodiment of the present disclosure, a handle assembly for a faucet includes a handle having a handle body, and a receiver defined by the handle body. The receiver includes at least one vertically tapered side wall defining a receiving chamber. A slot extends through the tapered side wall into the receiving chamber. A wire form retainer is coupled around the receiver and is at least partially disposed within the slot for extending into the receiving chamber. A tapered valve stem includes a retaining recess. The tapered valve stem is received within the receiving chamber of the receiver so that at least a portion of the wire form retainer extends through the slot of the receiver and is received within the retaining recess of the tapered valve stem.

According to another illustrative embodiment of the present disclosure, a faucet includes a handle having a handle body, and a receiver having a receiving chamber defined by the handle body and a slot extending through the handle body into the receiving chamber. A wire form retainer is coupled around the receiver and is at least partially disposed within the slot for extending into the receiving chamber. A valve cartridge is supported by a valve body and includes a valve stem having a retaining recess. A bonnet nut is threadably coupled to the valve body, and a bonnet cap cooperates with the bonnet nut. The valve stem is received within the receiving chamber of the receiver so that the wire form retainer is received within the retaining recess of the valve stem.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional fluids may be used.

Figure 1:
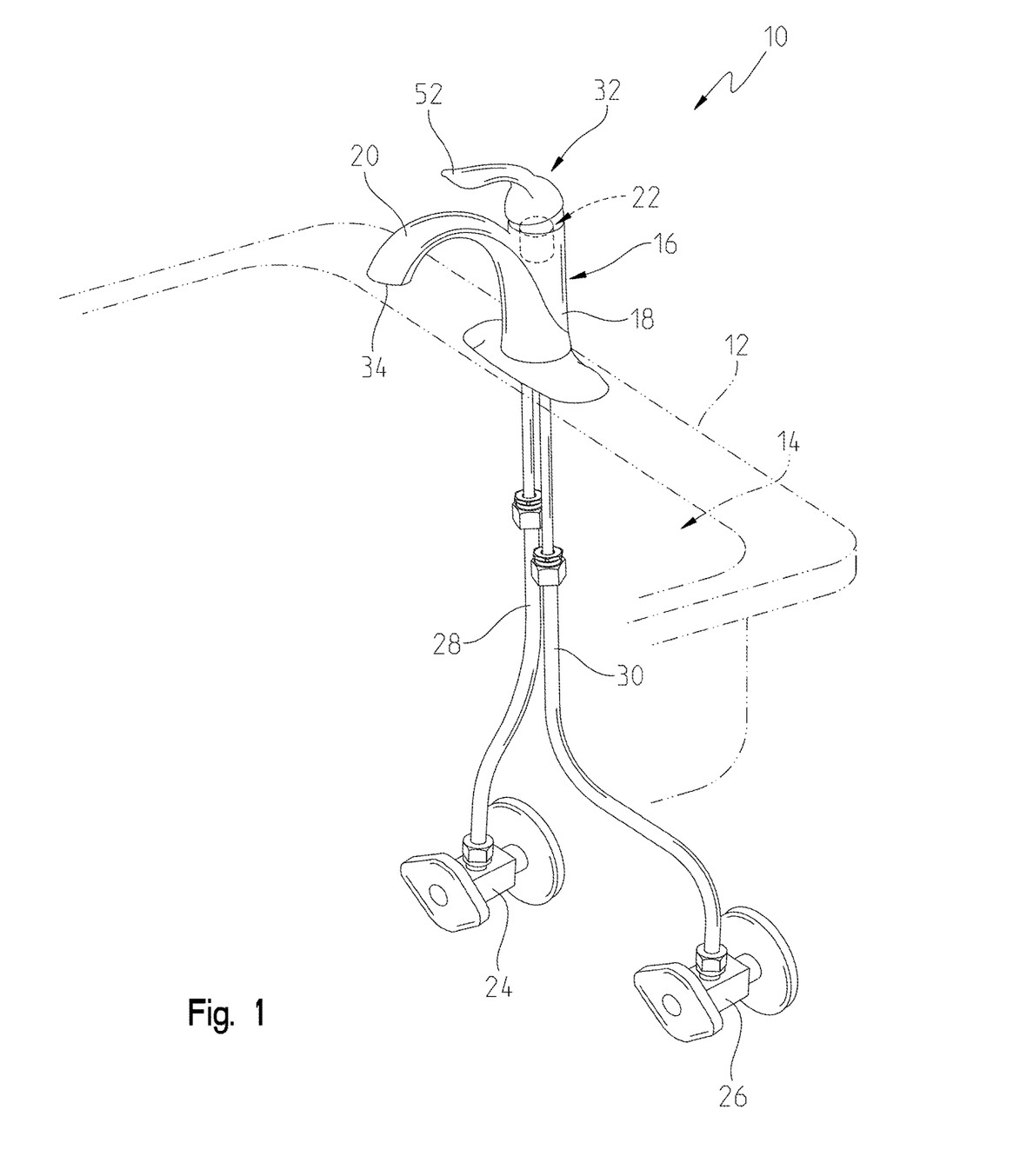
FIG. 1 is a perspective view of an illustrative faucet of the present disclosure, shown supported by a sink deck.

Referring initially to FIG. 1, an illustrative faucet 10 is shown coupled to a mounting deck 12, such as a sink deck for dispensing water into a sink basin 14. The faucet 10 illustratively includes a faucet body 16 including a hub or valve body 18 and a delivery spout 20. Illustratively, a valve cartridge 22 is supported within the valve body 18 and is fluidly coupled to hot and cold water supplies 24 and 26 (e.g., conventional water stops) via hot and cold water supply lines 28 and 30 (e.g., flexible tubes).

Figure 2:
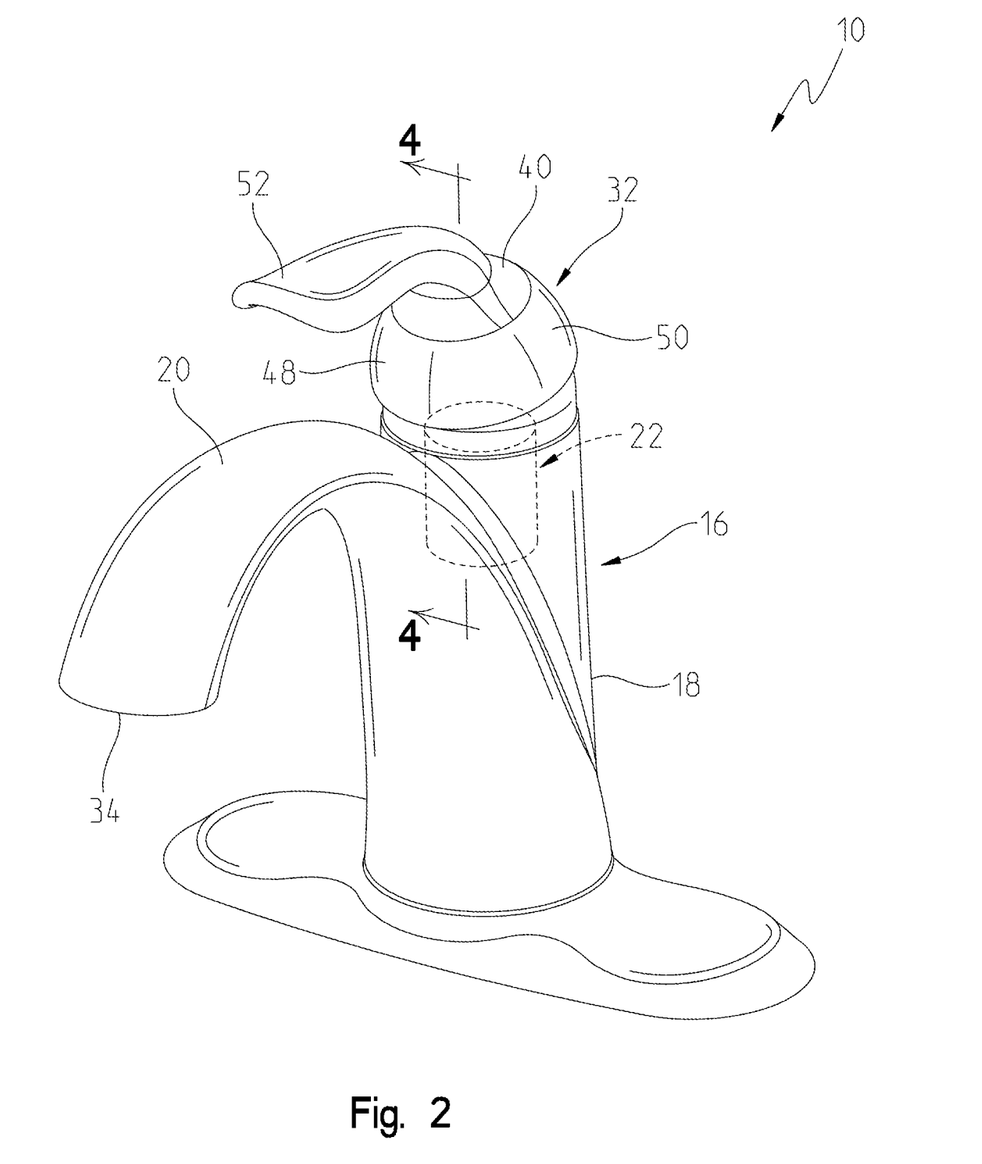
FIG. 2 is a perspective view of the illustrative faucet of FIG. 1.
Figure 3:
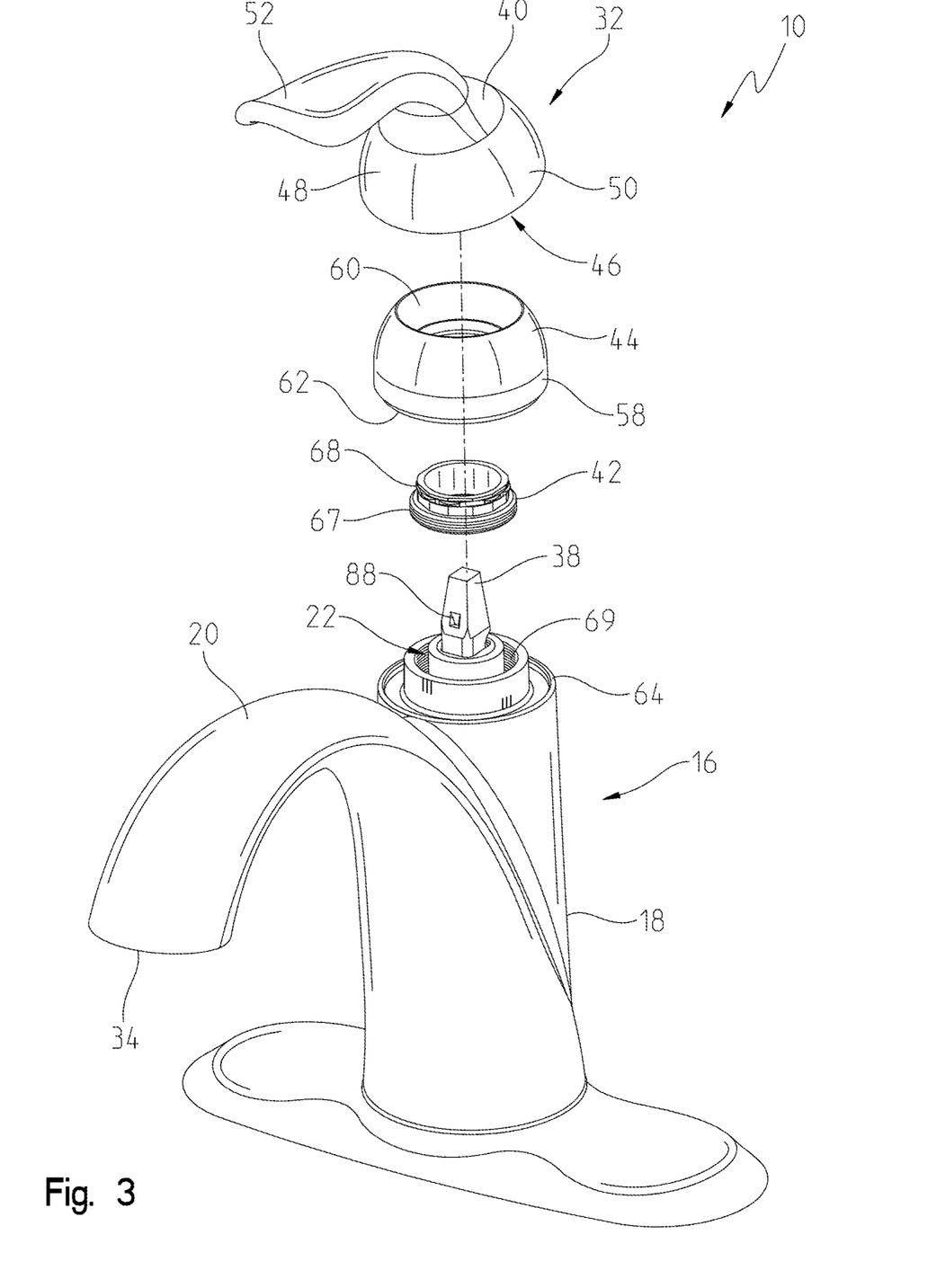
FIG. 3 is a partial exploded perspective view of the illustrative faucet handle assembly of FIG. 1.

Referring to FIGS. 2 and 3, the faucet 10 illustratively includes a handle assembly 32 operably coupled to the valve cartridge 22. Operation of handle assembly 32 controls the valve cartridge 22 and, hence, water flow from the conduits 28 and 30 to the water outlet 34. More particularly, the valve cartridge 22 may be of conventional design for controlling the flow rate and the temperature (i.e., mixture of water from the hot and cold water conduits 28 and 30) of water dispensed from the water outlet 34. The illustrative valve cartridge 22 includes a valve stem 38 configured to move a valve member (e.g., a valve plate or disc)(not shown) for controlling water flow rate and water temperature in a known manner.

Figure 6:
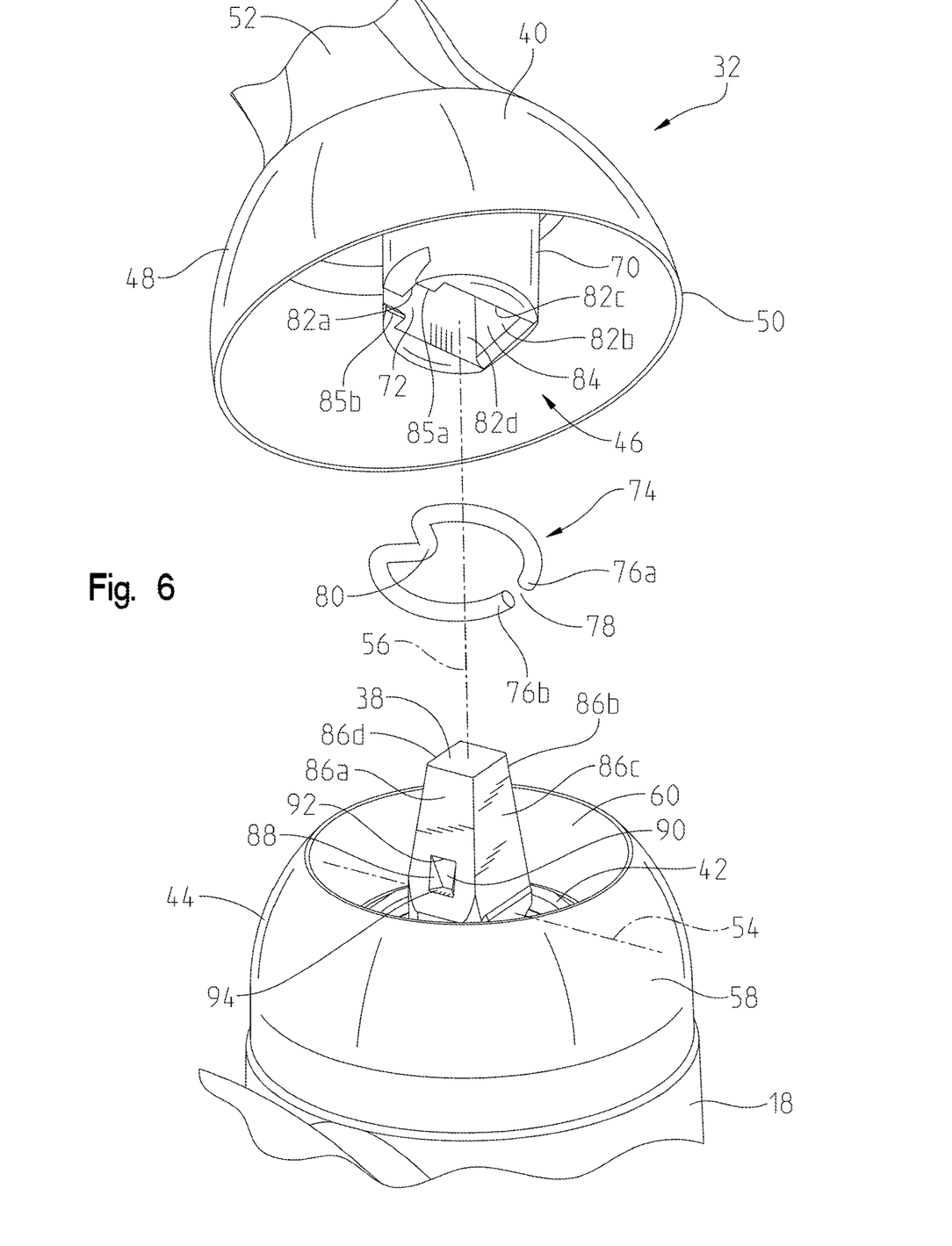
FIG. 6 is a partial exploded perspective view of the illustrative faucet handle assembly of FIG. 1.

The handle assembly 32 illustratively includes a handle 40 operably coupled to the valve stem 38 of the valve cartridge 22, a coupler 42 (e.g., a bonnet nut) securing the valve cartridge 22 to the valve body 18, and a bonnet cap 44 operably coupled to the bonnet nut 42 and received within a lower opening 46 of the handle 40. According to the illustrative embodiment of FIG. 2, the illustrative handle 40 includes a handle body 48 having a base 50 and a user interface 52. While the user interface 52 illustratively comprises a lever, the user interface 52 may comprise other components such as knobs. The handle 40 is operably moveable in both vertical and horizontal directions. More particularly, the handle 40 is configured to pivot about orthogonal axes to control water flow rate and temperature. More particularly, the handle 40 controls flow rate when rotated about a horizontal axis 54 and controls water temperature when rotated about a vertical axis 56 (FIG. 6). Alternatively, handle 40 could be operably moveable in other directions relative to the faucet body 48 to control water flow rate and/or temperature.

In the illustrative embodiment of FIG. 2, the lever 52 and the base 50 of the handle 40 are rigidly coupled and immovable relative to each other. For example, the handle body 48 may be machined from a metal or molded from a polymer and subsequently plated. Alternatively, the lever 52 and the base 50 may be movable relative to each other.

The bonnet cap 44 is coupled to the faucet body 16, and is received within the lower opening 46 of the handle 40. More particularly, the bonnet cap 44 illustratively includes a semi-spherical outer wall 58 and a frusto-conical inner wall 66 concentrically positioned within the outer wall 58. More particularly, a lower end of the outer wall 58 includes an annular lip 62 received within an annular protrusion or ring 64 of the faucet body 26. An inwardly facing surface 66 of the inner wall 60 engages with a retainer 68 supported by the bonnet nut 42. The retainer 68 illustratively comprises an annular clip formed of a resilient material, such as a polymer.

As noted above, the valve body 18 is coupled to the bonnet cap 44 via coupler or bonnet nut 42. The coupler 42 could be attached to the valve body 18 and the bonnet cap 44 via welds, adhesive, threads, or any other form of coupling. However, in the present embodiment, the bonnet nut 42 includes external threads 67 engaging with internal threads 69 of the valve body 18, and frictionally engages the bonnet cap 44.

The handle 40 and the bonnet cap 44 may be constructed from any number of materials including but not limited to metals and plastics. Additionally, different parts of the faucet 10 could be made from differing material, or the whole faucet 10 may be made from the same material.

Figure 4:
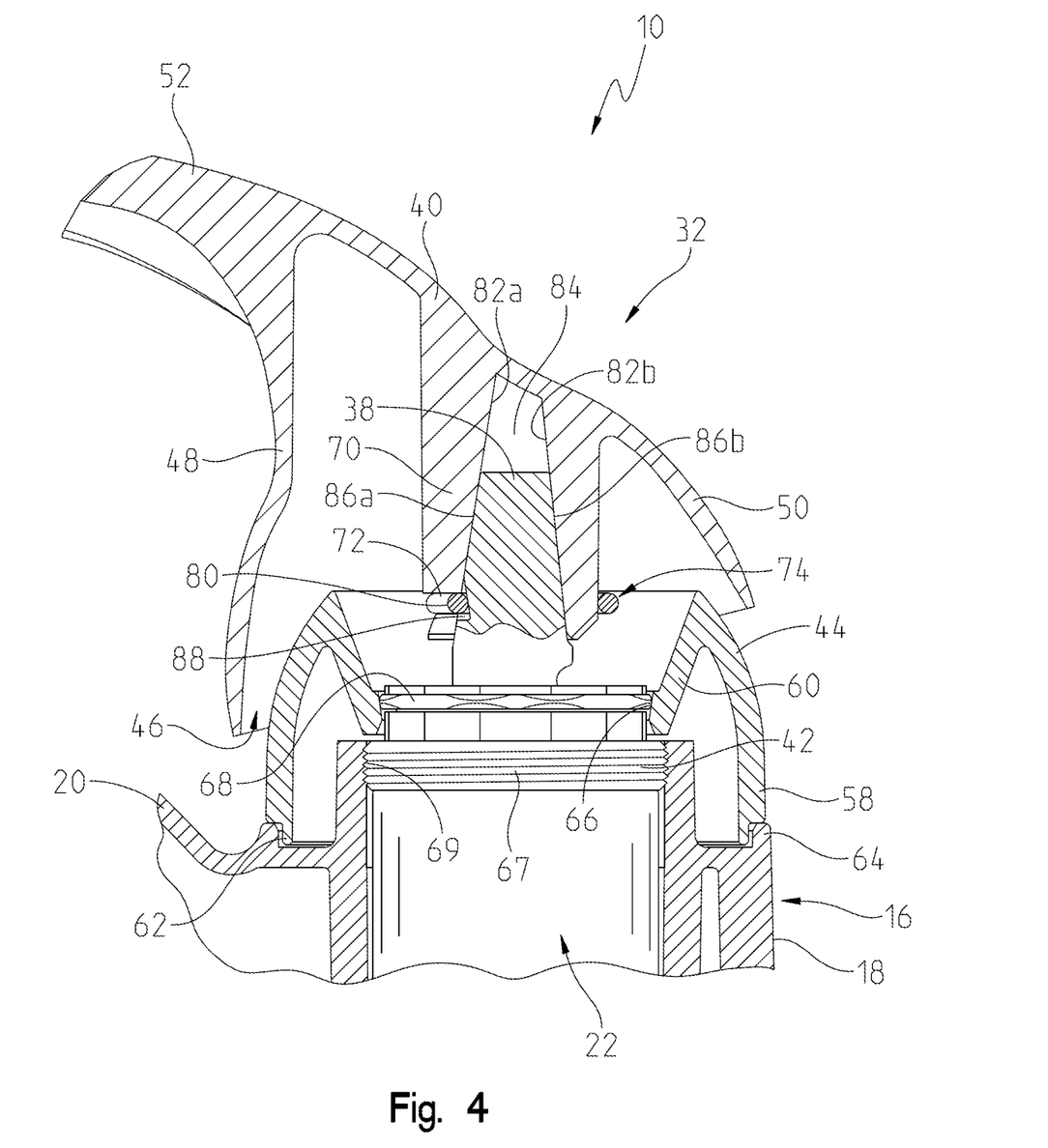
FIG. 4 is a cross-sectional view taken along line 4-4 of FIG. 1.

FIG. 4 is a partial horizontal cross-section of the handle assembly 32 and the valve body 18 receiving the valve cartridge 22. As illustrated, the handle assembly 32 includes the valve cartridge 22, the handle 40, the valve body 18, the coupler 42, and the bonnet cap 44. The handle body 48 further includes a receiver 70 positioned inwardly from the base 50. A slot 72 extends within the receiver 70 and receives a portion of a wire form retainer 74. The wire form retainer 74 may be comprised of metal or plastic and may be circular, or another shape with resilient properties.

In the illustrative embodiment, the wire form retainer 74 includes opposing arms 76a and 76b having first or open ends separated by an opening or gap 78. Second or closed ends of the opposing arms 76a and 76b are coupled together by an inwardly extending connecting portion 80.

Figure 5A:
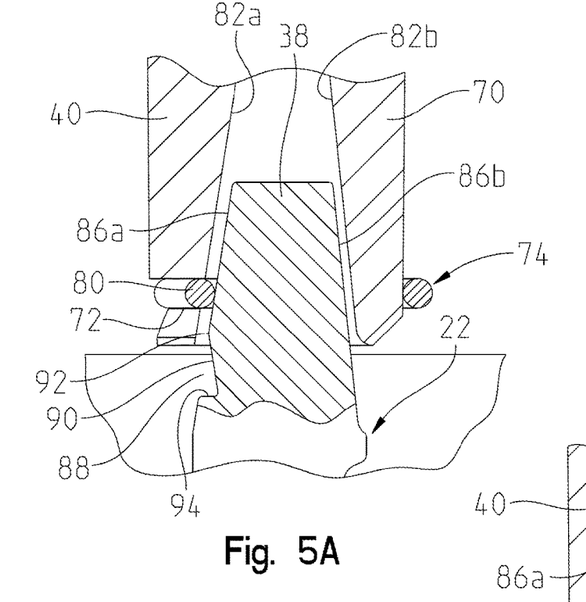
FIG. 5A is a cross-sectional view similar to FIG. 4, showing the faucet handle assembly in a first assembly step.
Figure 5B:
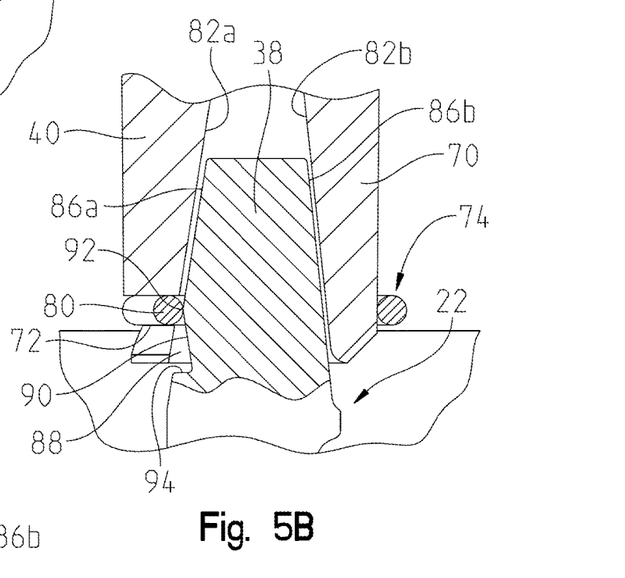
FIG. 5B is a cross-sectional view similar to FIG. 4, showing the faucet handle assembly in a second assembly step.
Figure 5C:
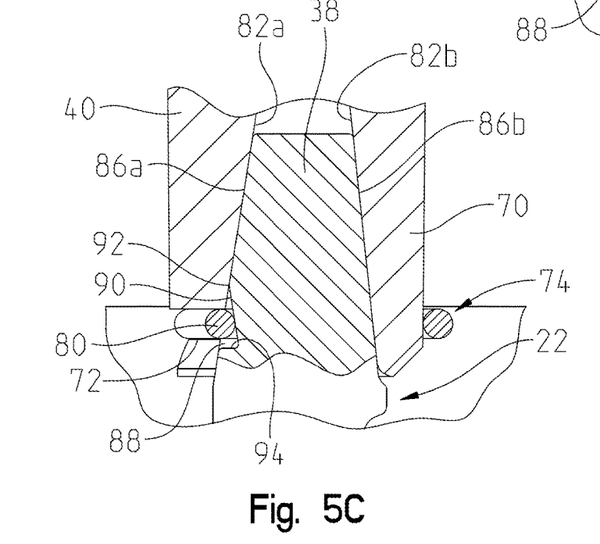
FIG. 5C is a cross-sectional view similar to FIG. 4, showing the faucet handle assembly in a third assembly step.

With reference to FIGS. 4-6, the receiver 70 of the handle body 48 includes at least one vertically tapered side wall 82 defining a receiving chamber 84. In the illustrative embodiment, four vertically tapered side walls 82a, 82b, 82c, 82d define the receiving chamber 84 having a rectangular transverse cross-section. The slot 72 extends through the tapered side wall 82a into the receiving chamber 84. The wire form retainer 74 is coupled around the receiver 70 and is at least partially disposed within the slot 72 and extends into the receiving chamber 84. A lower end of the slot 72 is illustratively defined by opposing protrusions or lips 85a and 85b.

The valve body 26 receives and supports the valve cartridge 22. Illustratively, the valve stem 38 of the valve cartridge 22 is tapered. More particularly, the valve stem 38 includes inclined or tapered surfaces 86a, 86b, 86c, 86d cooperating with the side walls 82a, 82b, 82c, 82d of the receiver 70. The valve stem 38 illustratively includes a retaining recess or groove 88 formed within the tapered surface 86a. The retaining groove 88 may take on different shapes in different embodiments. However, in the illustrative embodiment, the retaining groove 88 has a recessed surface 90 extending between an upper edge 92 and a lower edge 94. The surface 90 of the retaining groove 88 is illustratively tapered inwardly from the upper edge 92 to the lower edge 94. Alternatively, the upper edge 92 could be flat or take on a more curvilinear shape and may be angled opposite the taper of the tapered valve stem 38.

To couple the valve cartridge 22 to the handle 40, the tapered valve stem 38 is received within the receiving chamber 84 of the receiver 70 so that at least a portion of the wire form retainer 74 extends through the slot 72 of the receiver 70 and is received within the retaining groove 88 of the tapered valve stem 38. Additionally, to help limit unwanted movement, the surfaces 86 of the tapered valve stem 38 and the tapered side wall 82 of the receiver 70 have matching taper angles. When assembled, the bonnet cap 44 extends partially into the handle body 48, and the retaining groove 88 is below an upper edge of the bonnet cap 44.

In other words, the handle 40 captures the valve stem 38 between the tapered receiving chamber in the handle 40 and a wire form retainer 74 that is supported by the receiver 70. The location of the wire form retainer 74 can be below the top of the bonnet cap 44 because it does not need to be accessed during removal or assembly.

Referring to FIGS. 5A-5C, the wire form retainer 74 is integral for assembly and removal of the handle assembly 32. The wire form retainer 74 extends around the receiver 70 and at one side of the receiver 74 is the slot 72. The wire form retainer 74 is shaped so that the connecting portion 80 of the wire form retainer 74 extends through the slot 72 and at least partially into the receiving chamber 84. FIG. 5A shows an early or first step of assembly. The user positions the handle assembly 32 such that the receiving chamber 84 is aligned with the tapered valve stem 38 and begins to push down on the handle 40. As depicted in FIG. 5A, as the receiving chamber 84 moves down the tapered valve stem 38, the wire form retainer 74 catches the tapered side surface 82a of the tapered valve stem 38 and provides resistance and engages as the receiving chamber 84 moves down the tapered valve stem 38. This action provides a biasing force that pushes the receiver 70 up and away from the tapered valve stem 38.

FIG. 5B shows a middle or second step of the assembly process. The wire form retainer 74 is at its most flexed position immediately before it reaches the retaining groove 88 of the tapered valve stem 38. At this point, the wire form retainer 74 is not providing any axial retaining force. However, because the connecting portion 80 of the wire form retainer 74 is at the peak where the tapered sides 82 of the tapered valve stem 38 meet the tapered upper edge 92 of the retaining groove 88, any force that the user might put on the receiver 70, up or down, would result in resilient movement of the wire form retainer 74, thus biasing the receiver 70 into a locked and assembled position, or towards separation from the tapered valve stem 38.

FIG. 5C shows a final or third step of the assembly process, the receiver 70 and the tapered valve stem 38 in an assembled and locked position. Due to the shape and taper of the retaining groove 88, the wire form retainer 74 is in a resting position and axially retains the receiver 70. More particularly, the tapered shape of the retaining groove 88 holds the wire form retainer 74 in place. Furthermore, the retaining groove 88 could have a number of different shapes including a flat taper, as depicted in FIGS. 5A-5C, or it could have a curvilinear taper and shape.

In order to reverse the assembly process, and disassemble the handle assembly 32, force is applied in an upward direction to move the handle assembly 32 from the position of FIG. 5C back to the position of FIG. 5B, and then further force is needed to move the handle assembly 32 from the position of FIG. 5B to the position of FIG. 5A and completely apart. The shape and angle of the taper of the retaining groove 88 and, more particularly, the upper edge 92, changes the amount of force needed to take apart the handle assembly 32. Similarly, the angle of the tapered surface 86*a* of the tapered valve stem 38 would change the amount of force needed to assemble the handle assembly 32.

In other words, the wire form retainer 74 is snapped into slot 72 of the receiver 70. The receiving chamber 84 is then placed over the valve stem 38. Tapered or inclined surface 86*a* of the valve stem 38 pushes the wire form retainer 74 partially out of the slot 72 to allow the handle 40 to be inserted. The wire form retainer 74 snaps into the retaining groove 88 of the valve stem 38 to hold it in place. The handle 40 can be removed by pulling with a greater force than what is required to install the handle 40 and with minimal tools or skills required.

FIG. 6 is an exploded view of the handle assembly 32 of the exemplary embodiment. FIG. 6 shows one illustrative shape of the wire form retainer 74. As depicted, the wire form retainer 74 has open portion or gap which allows the resilient nature of whichever material is used for the wire form retainer 74 to create a biasing force in either an assembly direction or a disassembly direction. Additionally, the wire form retainer 74 has at least one portion that matches the overall shape and size of the receiver 70. This provides some friction which allows the wire form retainer 74 to hold its position relative to the receiver 70 and hold it in place. Finally, the wire form retainer 74 has curved or bent connecting portion 80 that matches the size of the slot 72 and allows the wire form retainer 74 to extend through the slot 72, provide resistance during assembly, and lock the receiver 70 and the tapered valve stem 38 in place while assembled. FIG. 6 also depicts one embodiment of the retaining groove 88 and one embodiment of the slot 72 in greater detail.

Although the invention has been described in detail with reference to certain preferred embodiments, variations and modifications exist within the spirit and scope of the invention as described and defined in the following claims.

What is claimed is:

1. A handle assembly for a faucet, the handle assembly comprising:
    a handle including:
        a handle body,
        a receiver defined by the handle body and including at least one vertically tapered side wall defining a receiving chamber,
        a slot extending through the tapered side wall into the receiving chamber, and
        a wire form retainer coupled around the receiver and including opposing first and second arms, and an inwardly extending connecting portion coupling together the first and second arms, the inwardly extending connecting portion being at least partially disposed within the slot for extending into the receiving chamber; and
    a tapered valve stem having a retaining recess; and
    wherein the tapered valve stem is received within the receiving chamber of the receiver so that the inwardly extending connecting portion of the wire form retainer extends through the slot of the receiver and is received within the retaining recess of the tapered valve stem.

2. The handle assembly of claim 1, wherein the wire form retainer is a resilient snap ring.

3. The handle assembly of claim 1, wherein the tapered valve stem is supported by a valve cartridge, a valve body receives the tapered valve stem, and a coupler secures the valve cartridge within the valve body.

4. The handle assembly of claim 3, wherein the coupler is a bonnet nut and the valve body is defined by a faucet body, the bonnet nut threadably coupled to the valve body.

5. The handle assembly of claim 4, further comprising a bonnet cap that cooperates with the bonnet nut.

6. A handle assembly for a faucet, the handle assembly comprising:
    a handle including:
        a handle body,
        a receiver defined by the handle body and including at least one vertically tapered side wall defining a receiving chamber,
        a slot extending through the tapered side wall into the receiving chamber, and
        a wire form retainer coupled around the receiver and being at least partially disposed within the slot for extending into the receiving chamber;
    a tapered valve stem having a retaining recess;
    wherein the tapered valve stem is received within the receiving chamber of the receiver so that at least a portion of the wire form retainer extends through the slot of the receiver and is received within the retaining recess of the tapered valve stem;
    wherein the tapered valve stem is supported by a valve cartridge, a valve body receives the tapered valve stem, and a coupler secures the valve cartridge within the valve body;
    wherein the coupler is a bonnet nut and the valve body is defined by a faucet body, the bonnet nut threadably coupled to the valve body;
    a bonnet cap cooperating with the bonnet nut; and
    wherein the bonnet cap at least partially extends into the handle body.

7. A handle assembly for a faucet, the handle assembly comprising:
    a handle including:
        a handle body,
        a receiver defined by the handle body and including at least one vertically tapered side wall defining a receiving chamber,
        a slot extending through the tapered side wall into the receiving chamber, and
        a wire form retainer coupled around the receiver and being at least partially disposed within the slot for extending into the receiving chamber;
    a tapered valve stem having a retaining recess;
    wherein the tapered valve stem is received within the receiving chamber of the receiver so that at least a portion of the wire form retainer extends through the slot of the receiver and is received within the retaining recess of the tapered valve stem;
    wherein the tapered valve stem is supported by a valve cartridge, a valve body receives the tapered valve stem, and a coupler secures the valve cartridge within the valve body;
    wherein the coupler is a bonnet nut and the valve body is defined by a faucet body, the bonnet nut threadably coupled to the valve body;
    a bonnet cap cooperating with the bonnet nut; and
    wherein the retaining recess is below an upper end of the bonnet cap.

8. The handle assembly of claim 1, wherein the retaining recess includes a tapered upper edge.

9. The handle assembly of claim 8, wherein the tapered upper edge of the retaining recess is curvilinear and opposite the taper of the tapered valve stem.

10. The handle assembly of claim 1, wherein the tapered valve stem and the tapered side wall of the receiver have matching taper angles.

11. A faucet comprising;
a handle including:
   a handle body,
   a receiver including a receiving chamber defined by the handle body and a slot extending through the handle body into the receiving chamber, and
   a wire form retainer coupled around the receiver and including opposing first and second arms, and an inwardly extending connecting portion coupling together the first and second arms, the inwardly extending connecting portion being at least partially disposed within the slot for extending into the receiving chamber;
a valve body;
a valve cartridge supported by the valve body and including a valve stem having a retaining recess;
a bonnet nut threadably coupled to the valve body; and
a bonnet cap that cooperates with the bonnet nut;
wherein the valve stem is received within the receiving chamber of the receiver so that the inwardly extending connecting portion of the wire form retainer is received within the retaining recess.

12. The faucet of claim 11, wherein the wire form retainer is a resilient snap ring.

13. The faucet of claim 11, wherein the receiver further includes at least one vertically tapered side wall.

14. The faucet of claim 13, wherein the valve stem further includes at least one vertically tapered side wall.

15. The faucet of claim 14, wherein the at least one vertically tapered side wall of the valve stem and the at least one vertically tapered side wall of the receiver have matching taper angles.

16. The faucet of claim 15, wherein the retaining recess includes a tapered upper edge.

17. The faucet of claim 16, wherein the tapered upper edge of the retaining groove is curvilinear and opposite the taper of the valve stem.

18. A faucet comprising;
a handle including:
   a handle body,
   a receiver including a receiving chamber defined by the handle body and a slot extending through the handle body into the receiving chamber, and
   a wire form retainer coupled around the receiver and being at least partially disposed within the slot for extending into the receiving chamber;
a valve body;
a valve cartridge supported by the valve body and including a valve stem having a retaining recess;
a bonnet nut threadably coupled to the valve body;
a bonnet cap that cooperates with the bonnet nut;
wherein the valve stem is received within the receiving chamber of the receiver so that the inwardly extending connection portion of the wire form retainer is received within the retaining recess; and
wherein the bonnet cap at least partially extends into the handle body.

19. A faucet comprising;
a handle including:
   a handle body,
   a receiver including a receiving chamber defined by the handle body and a slot extending through the handle body into the receiving chamber, and
   a wire form retainer coupled around the receiver and being at least partially disposed within the slot for extending into the receiving chamber;
a valve body;
a valve cartridge supported by the valve body and including a valve stem having a retaining recess;
a bonnet nut threadably coupled to the valve body;
a bonnet cap that cooperates with the bonnet nut;
wherein the valve stem is received within the receiving chamber of the receiver so that the inwardly extending connection portion of the wire form retainer is received within the retaining recess; and
wherein the retaining recess is below an upper end of the bonnet cap.

* * * * *